UNITED STATES PATENT OFFICE.

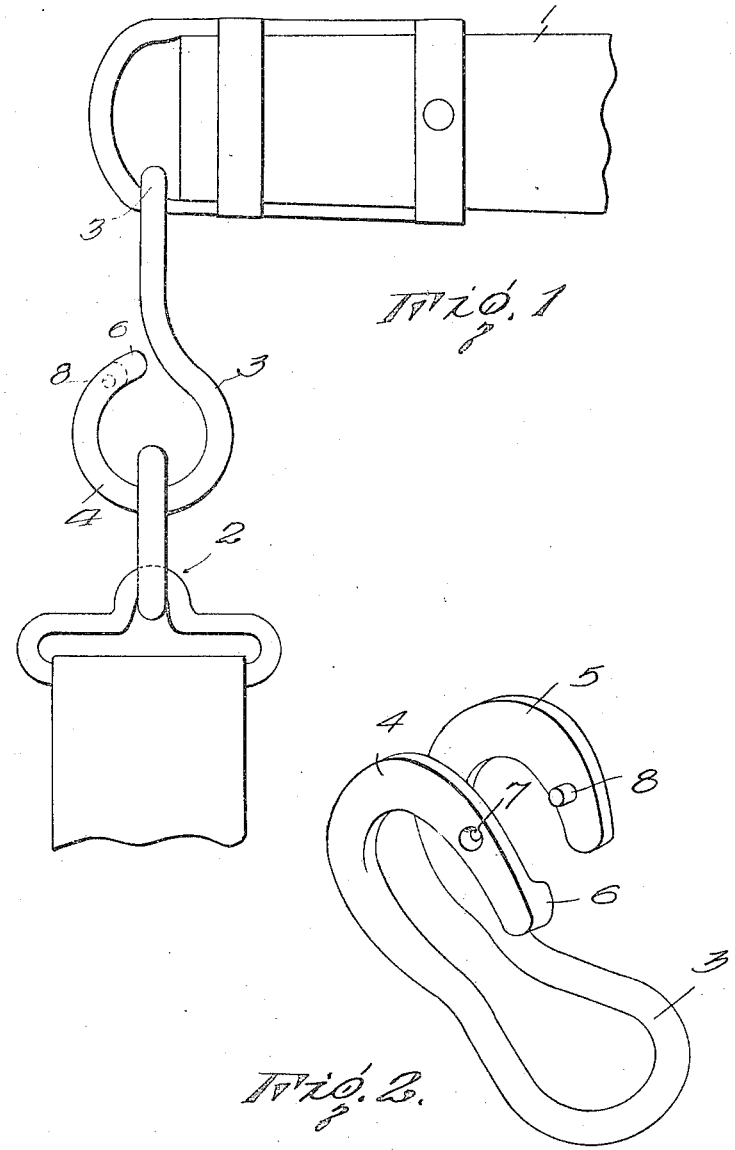

LOUIS FERRELL, OF SIKESTON, MISSOURI.

HOOK.

1,253,804.

Specification of Letters Patent.  Patented Jan. 15, 1918.

Application filed March 16, 1917.  Serial No. 155,271.

*To all whom it may concern:*

Be it known that I, LOUIS FERRELL, a citizen of the United States, and resident of Sikeston, in the county of Scott and State of Missouri, have invented certain new and useful Improvements in Hooks, of which the following is a specification.

This invention relates to improvements in hooks, and it is the dominant object of the invention to provide a novel chain hook so constructed as to permit the arranging of a chain link in the loop thereof without the necessity of welding or like joining processes commonly employed to secure the ends of the link or the ends of the loop or other portion of the hook together.

It is also an object of the invention to provide the hook with guide and fastening means, whereby portions thereof may be properly closed and then securely connected.

The improvements in the details and arrangement of parts will be apparent from an inspection of the accompanying drawing, in connection with the specific description hereinafter contained, and wherein the preferred embodiment of the invention is disclosed for the purpose of imparting a full understanding of the same.

In the drawing:

Figure 1 is a top plan of my improved hook as applied to a whiffletree, and

Fig. 2 is a detail in perspective of the same when in open position.

Having more particular reference to the drawing and in connection with which like reference numerals will refer to the same parts in the several views, it is to be noted that I have shown by way of illustration, my improved hook used as means for connecting the trace ends of draft harness to the ordinary whiffletree, the said whiffletree being designated 1, while the trace end with its link is designated 2.

The improved hook is composed of a single length of malleable metal which is bent intermediate its ends and so formed as to constitute a looped portion 3, while the remaining extremities are flattened and bent upon themselves to provide a pair of oppositely disposed hooked portions 4 and 5, the portion 4 being provided with an enlarged extremity 6 and an aperture 7, while the portion 5 carries a pin 8 and is of a length such as will permit the same to lie adjacent the inner extremity or shoulder of the enlarged portion 6. It is to be noted, that the adjacent faces of the hooked portions 4 and 5 are so formed as to permit close engagement thereof, thus, affording a neat and efficient joint when the same are moved to closed positions.

The hooked portions 4 and 5 are normally arranged in spaced apart relation, as shown in Fig. 2, and when it is desired to engage the same with a chain link or other like connection, a link or other portion of the connection is passed between the said hooked portions 4 and 5 into engagement with the loop 3. At this time, the hooked portions 4 and 5 are forced together, the adjacent flat faces thereof permitting snug engagement, while the pin 8 as carried on the shorter hooked portion is received within the opening 7 formed in the opposite hooked portion. To secure the hooked portions 4 and 5 together, the free end of the pin is swaged or upset in the opening 7, thus, locking the same therein. In this connection, it is to be noted that the opening 7 is countersunk so as to permit the swaged or upset portion of the pin 8 to lie flush with the outer face or surface of the hooked portion 4. The extremities of the hooked portion 5 which are arranged adjacent the shoulder formed by the enlarged portion 6 on the hooked portion 4, obviously, prevent relative longitudinal movement of the same and as a consequence, remove such strain from the locking pin 8.

With my improved hook, it will be appreciated by workers in the art, that links of chains or other connections may be readily engaged with the loop thereof in but a minimum amount of time, since the usual joining process, commonly, welding, is obviated by the provision of the novelly formed hooked portions and the locking or securing means therefor.

Manifestly, the construction shown is capable of considerable modification and such modification as is within the scope of my claims, I consider within the spirit of my invention.

I claim:

1. A hook, comprising a length of metal bent intermediate its ends and looped, the extremities of the metal being hooked and arranged opposite each other, one of said hooked portions being of a greater length than the adjacent hooked portion and having a shoulder formed thereon, and securing means on one of the hooked portions engageable with the other hooked portion.

2. A hook, comprising a length of metal bent intermediate its ends and looped, the extremities of the metal being hooked and arranged opposite each other, one of said hooked portions being of a length greater than the adjacent hooked portion and having a shoulder formed thereon, said longer hooked portion having an opening formed therein adjacent its shoulder, and a pin carried by the opposite hooked portion and receivable in said opening.

In testimony whereof, I affix my signature hereto.

LOUIS FERRELL.

Copies of this patent may be obtained for five cents each, by addressing the "Commissioner of Patents, Washington, D. C."